May 10, 1966  R. E. PERKINSON ETAL  3,250,896
SYNCHRONIZING MEANS FOR REMOTELY POSITIONED TIMING DEVICES
Filed April 16, 1962  5 Sheets-Sheet 1

FIG. 1.

FIG. 8.
LATE CONDITION

INVENTORS
ROBERT E. PERKINSON
WILBUR H. VON FANGE
MARTIN J. BORROK
BY *Gravely, Lieder & Woodruff*
ATTORNEYS

FIG. 5.

INVENTORS
ROBERT E. PERKINSON
WILBUR H. VON FANGE
MARTIN J. BORROK
BY Gravely, Lieder & Woodruff
ATTORNEYS

FIG. 6.
IN-SYNCHRONISM

FIG. 7.
EARLY CONDITION

INVENTORS
ROBERT E. PERKINSON
WILBUR H. VON FANGE
MARTIN J. BORROK

BY *Gravely, Lieder & Woodruff*
ATTORNEYS

FIG. 9.

INVENTOR.
ROBERT E. PERKINSON
WILBUR H. VON FANGE
MARTIN J. BORROK
BY Gravely, Lieder & Woodruff
ATTORNEYS United States Patent Office 3,250,896
Patented May 10, 1966

3,250,896
SYNCHRONIZING MEANS FOR REMOTELY
POSITIONED TIMING DEVICES
Robert E. Perkinson, St. Louis County, Wilbur H. Von
Fange, Kirkwood, and Martin J. Borrok, St. Louis
County, Mo., assignors to McDonnell Aircraft Corporation, St. Louis County, Mo., a corporation of Maryland
Filed Apr. 16, 1962, Ser. No. 187,832
24 Claims. (Cl. 235—150.23)

There are many devices and systems where synchronized timing devices can be used. For example, they can be used in movable and relatively movable objects to compute the distance and the rate of change of the distance between such objects, and they can be used in conjunction with collision avoidance systems and the like to determine the likelihood of a collision occurring and also the probable time to the collision if nothing is done to avoid it. They can also be used in any system requiring accurate time keeping means and where it is desired to periodically check the time keeping ability and readjust or correct it to bring it into synchronism with some accurate standard time device. It is also contemplated to use the subject means on airplanes, in space vehicles, in ships, in ground vehicles and at spaced ground station locations around the earth. In addition, it is contemplated to use the subject device in satellites as a means for global time synchronization and location computation. In order to simplify understanding the invention, however, this specification describes the subject device in connection with its use in a collision avoidance system for airplanes and the like.

Many attempts have been made to devise a collision avoidance system for air and space vehicles which is extremely accurate and fast acting to provide the pilot with information as to a potential collision threat and the probable time to collision, to enable him to act intelligently in time to avoid disaster. This is possible with the present synchronized timing means which include means for transmitting warning signals at predetermined times. Furthermore, such signals need only move in one direction between a sending airplane and a receiving airplane because of the fact that all airplanes are equipped with synchronized time devices. This therefore saves the time which otherwise would be required for sending and receiving back a bounce signal as in conventional two-way radar systems. Furthermore, with the present one-way system the signals sent out are positive transmitted signals and therefore not as subject to interference by environmental conditions and stray reflections.

To effect the desired synchronization the subject synchronizing means includes means for sending signals to other places having similar timing devices, and other means able to receive signals sent from equipment at the other locations. Means must also be provided for interpreting the information received from other equipment and for making computations to ascertain the range or distance thereto and the range rate. Upon determination of this information, the equipment must then be able to separate signals arriving from potentially dangerous vehicles from other signals to provide a timely warning. This is done at the receiving point on the basis of the information computed as to range and range rate, and also on the basis of information as to altitudes and rate of change of altitude all of which enters into computations as to the probability of a collision and the probable time to collision.

In order to make such a system operable and practical it is proposed to provide accurate timing means on all such vehicles, and also to provide means for periodically synchronizing the timing of said means with an accurate time device or standard. The most accurate known timing devices, however, are subject to some variation due to environmental and other conditions, and occasionally get out of step due either to a phase or frequency shift. If some means are not provided to resynchronize them they will become ineffective. This invention covers means for synchronizing such timing devices so that they remain accurate and can be used to accurately determine the aforesaid information.

The subject invention, as will be explained provides means for periodically checking the synchronization and if necessary synchronizing relatively accurate remotely positioned timing devices. As already stated the invention will be described and illustrated in conjunction with a collision avoidance system but it is not intended to restrict the invention to such a system since there are many other situations and systems where it is contemplated that the device can be used. When the subject device is used in an aircraft collision avoidance system, as many airplanes as possible are equipped with timing devices which must be maintained in synchronism, and each airplane is assigned a specific time or message slot in which to check its timing device and if necessary to correct the phase or frequency thereof. During its assigned message slot each airplane having a synchronized system will transmit information as to its altitude and so forth. By knowing the time at which a particular airplane is to transmit and also the time of receipt of a signal from that plane, it is possible having synchronized timing devices to calculate information as to the relative positions of the sending and receiving planes and rate of change of the distance therebetween. From this information all receiving aircrafts within the range of the sending plane can determine the likelihood of a collision taking place between the sending plane and receiving planes and also the probable time to collision. As already noted, however, the accuracy of the information depends upon accuracy of the synchronization of the timing devices on the several planes because even a slight phase or frequency variation will result in considerable error in location and range rate.

It is therefore essential that all aircraft or other vehicles or ground stations include timing means, and further that means also be provided for bringing the various timing means into synchronism. The subject invention covers such synchronizing means.

The present invention contemplates the insulation of an accurate timing device in each airplane, and it also contemplates installing accurate timing devices at spaced ground station locations around the country or around the entire globe. In the usual situation the aircraft will be synchronized to the ground stations and the ground stations will in turn periodically be synchronized to a standard time device such as to the one maintained by the Bureau of Standards in Washington, D.C.

One of the most accurate known timing devices is the atomic clock. Such devices however, are relatively expensive and at the present stage of development are too expensive to install universally in air and space crafts. Crystal oscillators also make accurate timing devices and have the advantage of being considerably less expensive and more readily available than atomic clocks. It is therefore contemplated to employ crystal oscillators for the accurate timing devices installed on airplanes and at ground stations although other types of oscillators and timing devices could also be used.

Regardless of the type of timing device employed, it is necessary to periodically check it to make sure it is synchronized and keeping time accurately. Crystal oscillators ordinarily will maintain fairly accurate time if their environmental conditions are controlled. However, even crystal oscillators may develop slight variations or shifts in phase or frequency. For this reason periodic synchronization should be made.

For obvious reasons it is also important that the periodic synchronization take place automatically in order to relieve the pilot or other personnel of extra duties. In some situations, however, it may be desirable and it is contemplated to initiate synchronization manually.

The means for synchronizing two or more remotely positioned timing devices according to the present invention comprises a first timing device capable of keeping time in preselected increments and groups of increments, means for comparing a preselected group of increments of the first timing device with a preselected group of increments of the second device to ascertain if the compared groups take place simultaneously, and means for shifting the time during which the group of increments from one of said timing devices takes place in a direction to make the said groups take place simultaneouly.

In one form of the said synchronizing means the said first timing device has associated therewith means for transmitting impulses at preselected times, and means for receiving impulses, and said second timing device has associated therewith transmitting means, receiving means, and accumulating or counting means for registering the passage of time commencing at the beginning of each group of increments and continuing to the end of each group, means associated with the accumulating means for identifying instants of time during a group of increments when an impulse is received from the transmitting means at the first timing device, said accumulating means energizing the transmitting means at the said second timing device to transmit a return impulse to the first timing device at a later instant of time in the group that is inversely related to a predetermined instant of time in the group compared to the relationship between the beginning of the group and the time of receipt of the impulse from the first timing device, means at said first timing device for comparing the time of receipt of the return impulse with a preselected time in its increment group, and means at said first timing device for shifting the time of its increment groups so that the return impulse will effectively coincide with the preselected time in its increment group.

The subject invention also includes means for adjusting the frequency or time keeping rate of the timing device being synchronized whenever it varies from the frequency of the timing device being synchronized to.

It is contemplated to use the subject device to synchronize any two or more remotely positioned timing devices such as might be located on remotely positioned airplanes, ground stations, or any combination of these or other devices. It is not intended however, to limit the present device to any particular type of equipment, application or environment.

It is a major object of the present invention to provide means for synchronizing two or more timing devices.

Another object is to provide time synchronizing means capable of cancelling out the effect of differences in the locations of timing devices.

Another object is to provide automatic means for periodically checking the synchronization and when necessary synchronizing timing devices such as electronic timing devices including atomic clocks and crystal oscillators.

Another object is to provide more accurate collision avoidance equipment and the like.

Another object is to provide accurate means for measuring range, range rate, and other location information.

Another object is to provide faster means for determining location and changes of location of remotely positioned movable objects.

Another object is to provide accurate means for determining the position and changes of position of objects such as aircraft and space vehicles.

Another object is to provide means for determining the probable time to collision between two or more relatively movable objects.

Another object is to provide relatively inexpensive means for synchronizing remotely positioned timing devices.

Another object is to provide means for synchronizing timing devices which do not require the attention of an operator.

Another object is to provide means capable of synchronizing many timing devices at different locations to many different synchronized time standards also at different locations.

Another object is to provide means for comparing the time of receipt of signals received from remotely positioned time standards as a means for checking the accuracy thereof.

Another object is to provide means for orderly and repeatedly checking the synchronization and when necessary synchronizing remotely positioned timing devices.

These and other objects and advantages of the present invention will become apparent after considering the following detailed specification showing and describing several preferred forms of the invention in conjunction with the accompanying drawings, wherein:

Figure 1:
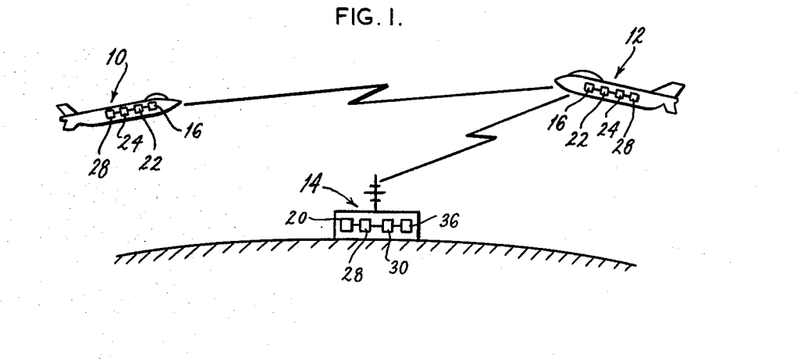
FIG. 1 is a diagrammatic view showing two in-flight airplanes and a ground station all of which are equipped with timing devices and related circuits constructed according to the present invention.

Referring to the drawings by reference number, the number 10 refers to a first in-flight airplane, number 12 refers to a second in-flight airplane, and number 14 refers to a ground station. Both airplanes and the ground station are provided with accurate timing devices such as atomic clocks or crystal oscillators. For purposes of this disclosure it will be assumed that crystal oscillators are used for all of the timing devices, and it will be further assumed that the timing device located at the ground station, is accurate and is in synchronism, and can therefore be relied on and used as a standard to which the timing devices in the airplanes are synchronized. The latter assumption is not necessarily true in all cases, and it is contemplated that the timing device at the ground station may also need to be synchronized at periodic intervals. The timing devices for the first and second airplanes are identified by the number 16 and the timing device at the ground station is identified by 20. It is to be understood and expected, however, that the present system may be employed on many airplanes and at many ground stations.

Each airplane 10 and 12 also carries transmitter means 22, receiver means 24, and means for synchronizing its timing device with the standard timing device 20 at the ground station. In addition, each airplane also carries as part of its equipment means for accumulating or counting time in predetermined increments during particular predetermined time periods. Binary counters using well known flip-flop circuitry can be used for the counters as well as for all of the counters in the system, if desired. Two kinds of time accumulating counters are used in the system, one type will be referred to as count-up counters 28 and these count by adding predetermined time increments beginning at a low or zero time and counting the passage of increments to a later time. This counting operation repeats itself in succeeding time periods while the equipment is operating.

A similar accumulator or counter 28 is also provided at each ground station. In addition, in the embodiment shown in FIGS. 1–5, each ground station 14 is also provided with a count-down counter 30 which counts in the same or in similar time increments to the counter 28 but in a reverse manner, that is they start with an initial setting or count representing a predetermined number of time increments at the beginning of each time period and count by subtracting time increments from the initial setting during the time periods to arrive at a final lower later count such as a zero count at the end of each period. This operation is also repetitive during succeeding time periods or message slots. If the counters 28 and 30 at the ground stations start counting at the same beginning time in each time period and count by adding or substracting equal increments, and if the counters 28 cover a range of counts from zero to 1000 microsecond increments during the same time that the counters 30 are counting from an initial setting of 1000 microseconds down to zero, then at any particular instant of time the combined counts of the counters 28 and 30 at each station will equal 1000. For example, a count of 300 microseconds in the counters 28 will occur at the same time that a count of 700 microseconds is in the counters 30. By the same token, a count of 300 microseconds in the counters 30 will occur at a later time in each time period than the same count of 300 occurs in the counters 28. This latter fact is important to the operation of the synchronizing means disclosed in FIGS. 1 and 5 as will be shown hereinafter.

Figure 2:
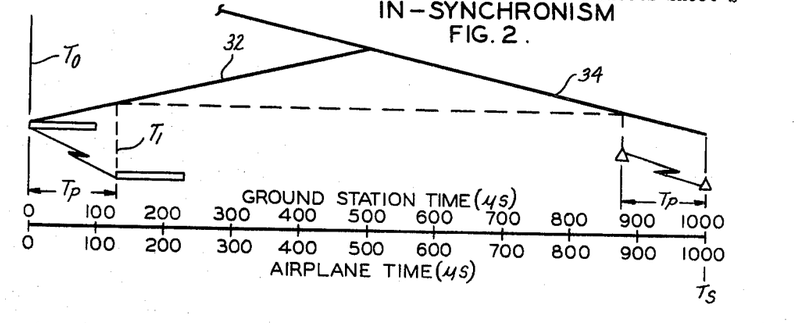
FIG. 2 is a graphical representation illustrating the operation of one form of the present synchronizing means, the graph illustrates the condition in which two remotely positioned timing devices are in synchronism.
Figure 3:
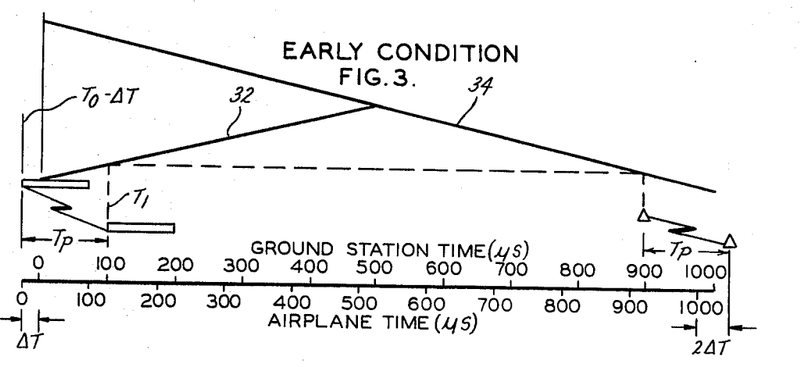
FIG. 3 is a graphical representation similar to FIG. 2 but illustrating a condition where the timing device to be synchronized is ahead of synchronism.
Figure 4:
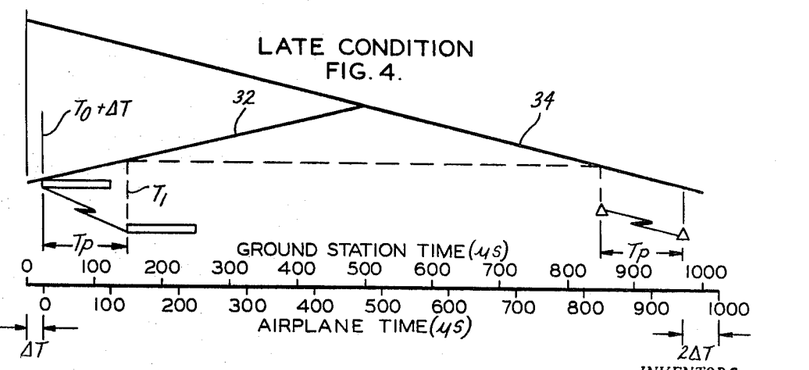
FIG. 4 is another graphical representation similar to FIG. 2 illustrating a condition where the timing device to be synchronized is behind synchronism or is too late.
Figure 5:
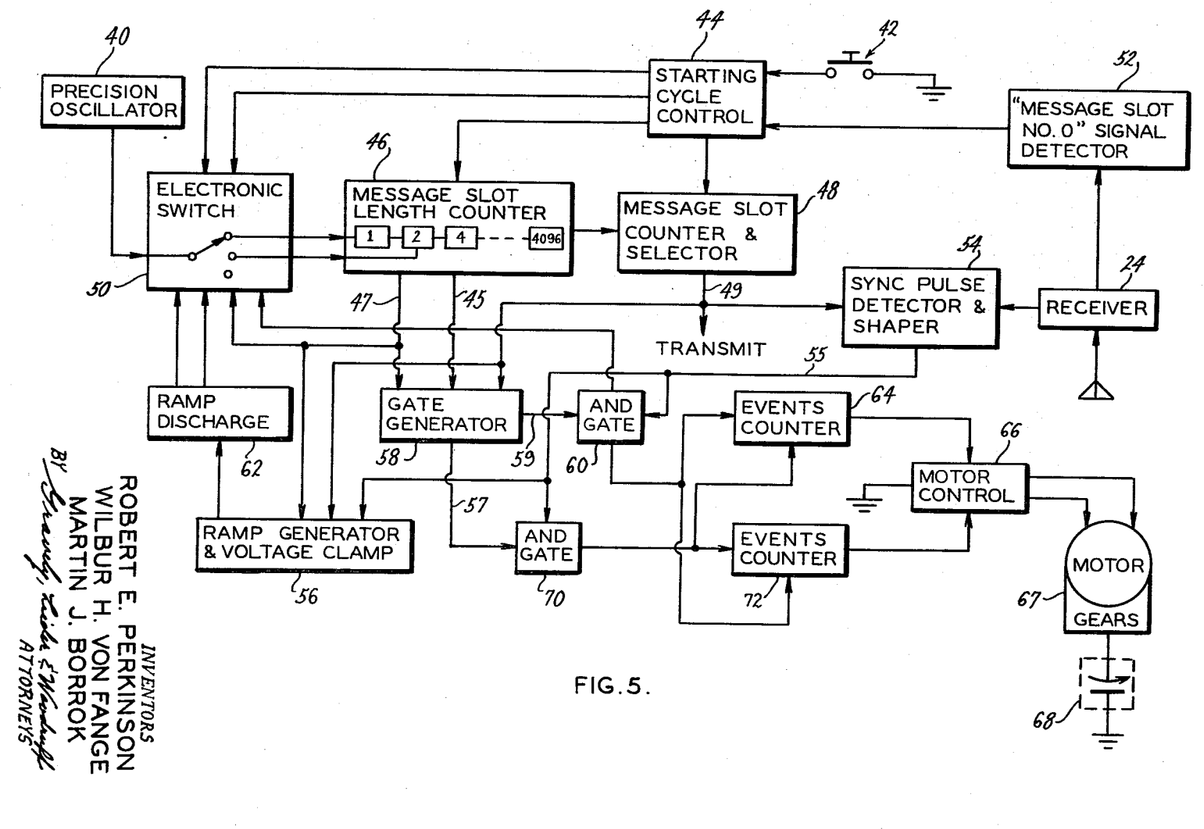
FIG. 5 is a block diagram showing an automatic synchronization device constructed according to the present invention.

Referring to FIGS. 2–4, there is shown in graphical form the basic idea employed by the synchronizing means of FIG. 5. Referring to FIG. 2 there is shown an upwardly sloping line 32 which represents a plot of the instantaneous increment counts of the count-up counters 28 at the ground stations. At zero time which is to the left, the count-up counters 28 commence counting from a zero count. No specific upper limit for the count of counters 28 is required and the counters may continue to count to 500 microseconds, 1000 microseconds or to any predetermined count or even to the end of the time period. At the same zero time the countdown counters 30 also commence counting from an initial predetermined count such as 1000 microseconds representing a predetermined portion of the time period. The count-down counters 30 as already mentioned count from the initial count down to a lower later count such as zero count at some later predetermined instant of time in the period. If desired, the count-down counters can also commence counting at an earlier or later time depending upon the requirements of the system including the requirements of timing devices to be synchronized. In FIG. 2 the line 34 is a plot of the instantaneous counts of the count-down counter 30 over the interval from zero to 1000 microsecond increments.

In FIG. 2 is shown the condition in which the timing device 16 on airplane 10 is in synchronism with the standard timing device 20 at the ground station. In this condition the airplane 10 transmits a signal beginning at zero time ($T_0$). This signal is received at the ground station at a later time ($T_1$) depending upon the distance between the airplane 10 and the ground station 14. This time difference is the propagation time ($T_p$). When the ground station receives the signal at ($T_1$), a circuit is energized to stop the counting of its count-up counter 28. The ground station count-up counter 28 therefore remains in a condition with a predetermined count in it corresponding to the apparent time required for the signal from the plane to reach the ground station. Means for stopping the counter 28 are well known in the art and need not be described in detail.

With the counter 28 at the ground station stopped with a fixed setting in it, and with the ground station counter 30 continuing to count-down toward a final setting such as zero, circuit means are provided for comparing the fixed count in counter 28 with the decreasing count in counter 30. When the two counts are the same, the transmitting means 36 at the ground station will be energized to transmit a return signal which will subsequently be received at the airplane. If the return signal transmitted by the ground station is received by the airplane at a preselected time in the time period such as at 1000 microseconds after the beginning of the time period, this means that the timing device 16 in the airplane is synchronized with the timing device 20 at the ground station and no correction is required. This condition is illustrated in FIG. 2.

In FIG. 3, a condition is illustrated wherein the timing device in the airplane is out of synchronism with the timing device at the ground station by being ahead of or earlier than the ground station timing device. It will be noted in FIG. 3 that the timing device 16 in the airplane is out of synchronism and is transmitting earlier than it should by an amount of time equal to delta T which can be written symbolically ($\Delta T$). Assuming that the airplane in the illustration of FIG. 3 is approximately the same distance from the ground station as the airplane in FIG. 2, the signal transmitted thereby will be received by the ground station at a correspondingly earlier time by the same amount ($\Delta T$). This will stop the counter 28 at the ground station at the earlier time. Therefore, it will take a longer time for the counter 30 to reach the same count as the counter 28, and hence the return signal will be transmitted later in the time period and received back at the airplane at a time later than the preselected synchronizing time of 1000 microseconds. The amount of time difference between the uncorrected preselected time as measured at the airplane and the time at which the return signal is actually received is equal to twice the phase difference between the two timing devices, or $2(\Delta T)$.

The reason the signal arriving back at the airplane is displaced in phase by twice the error $\Delta T$, which represents the amount that the airplane is out of synchronism, can be explained as follows assuming that the airplane is keeping time in periods of the same duration as the ground station. The counters 28 and 30 at the ground station measure a period which takes into account the propagation time as well as the phase error of the signal received from the airplane. The counters thereafter inversely relate the time of recipt of the error signal to some later preselected time in the time period before transmitting a return signal. Therefore at the time the return signal transmission is initiated, the return signal precedes the preselected time by an amount equal to the propagation time plus the original phase difference at the ground station. Therefore, by the time the return signal is received at the airplane the propagation time is expended resulting in the return signal arriving at the airplane displaced from the airplane's preselected synchronizing time by twice the amount of the actual phase error existing between the two timing devices.

In an actual embodiment of the present device applied to airplanes, the time at which the comparison is made between time of receipt of the return signal and the preselected synchronizing time is usually selected to be ahead of the end of the airplane's assigned message slot. This is done so that synchronism can be accomplished before the end of the message slot. The reason for this is that each airplane is assigned a particular message slot during which its timing device is to be synchronized, and it is undesirable to have the synchronizing time of one airplane spill over or interfere with the time assigned to another plane. Each airplane, for example, may be assigned a one millisecond message slot in which it must check and synchronize its timing device and also send information as to altitude and changes of altitude. In a three second period therefore, there will be time for approximately three thousand message slots. If each airplane is assigned a different one of these message slots, then every three seconds every airplane within range of a ground station will go through a synchronizing operation which will be repeated every three seconds. In order to prevent an airplane from receiving or sending a signal outside of its assigned message slot the count-down counters at the ground stations should reach the same count that is in the count-up counters for transmitting a return signal before the end of the message slot. Then if the return signal is received late at the airplane there will still be time to correct the out of phase condition before the end of the message slot. If the return signal is received early, no problem exists. Since it is unusual for timing devices of the type contemplated to drift out of phase by more than a very few microseconds, there is usually plenty of time after the preselected synchronizing time to correct for late arriving return signals.

FIG. 4 illustrates the opposite condition from FIG. 3 wherein the airplane timing device 16 is out of phase or synchronism by being later in time than the timing devices or standards at the ground stations. This means that when the airplane transmits a signal at its zero time it will be received at all ground stations within range and used to stop the ground station counter-up counters 28 at a later time than would be the case if the timing devices were in phase. This in turn means that less time will be required to reach an equal count condition on the count-down counters 30, and therefore when the return signals are transmitted by the ground stations they will be received at the airplane early by $2(\Delta T)$ where $(\Delta T)$ again represents the phase error between the airplane timing device and the time standards at the ground stations. In this situation as in the situation illustrated in FIG. 3, correction is made by shifting the phase of the timing device in the airplane by an amount equal to $(\Delta T)$. Since $\Delta T$ is equal to one-half of the time difference between the time the return signal is received at the airplane and the preselected synchronizing time $T_s$, the correction can be made by delaying the airplane timing device. This can be done by changing to a half time counting rate for a period equal to $2\Delta T$ or by stopping the counting for a predetermined period. The means for making the correction will be described hereinafter.

The block diagram of FIG. 5 illustrates one of many possible circuits and circuit arrangements for the subject synchronizing means. In the diagram the timer is shown as crystal oscillator 40, and it is expected that the oscillator 40 will be a precision instrument able to remain in or close to synchronism. From time to time, however, even the most accurate timing devices will need to be checked and resynchronized. The two things which effect synchronization are phase shift which causes the timing of one device to shift and be out of step with what it should be: and frequency shift which relates to the time keeping characteristics. Either condition can exist alone or they can exist together. Furthermore, different means must be provided to correct for errors in phase and frequency. Both conditions will effect synchronism and also the accuracy of systems in which the devices are used. The manner of checking the synchronism of such devices and of synchronizing the same are important to the present invention.

Once the set of FIG. 5 is turned on and warmed up, an initial synchronizing operation is instituted by pressing a reset control 42. Thereafter the set will automatically check and if necessary re-synchronize itself every time its assigned message slot occurs provided the set is within range of a ground station having a time standard. When the reset control is depressed it energizes a starting cycle control 44 which in turn presets a message slot length counter 46 and a message slot counter and selector 48. The starting cycle control 44 also energizes an electronic switch 40 which prevents a signal from the precision oscillator 40 from reaching the message slot length counter 46.

A signal, known as the zero message slot signal, is transmitted from every ground station once every few seconds depending upon the system capacity and the slot length, and this signal is usually transmitted just ahead of the first message slot position to provide a rough alignment of the airplane message slot counter with the message slot counters at the ground stations. The mechanism in the airplane that responds to the zero message slot signal is identified in FIG. 5 as the message slot No. 0 signal detector 52.

The detector 52 upon receiving the zero message slot signal energizes the starting cycle control 44 which in turn energizes the electronic switch 50 which up to this time has been preventing the oscillator 40 from energizing the message slot length counter 46.

Up to this point everything that has been done is in the starting sequence and need not be repeated unless or until the set is turned off and subsequently restarted. Also, if the device is employed as part of a collision avoidance system or the like it may also be necessary to provide additional circuits to prevent transmission of any information until after the set is synchronized.

The message slot length counter 46 begins its first message slot counting operation and is reset after each message slot is completed. In this way its counting operation repeats itself for each message slot. The counting operation of the counter 46 is therefore controlled by the action of the precision oscillator 40 and in turn controls the action of the selector 48 which counts each message slot and resets itself upon reaching a preselected number equal to the number of message slots designed into a given system. By the same token the message slot length counter 46 controls the time at which the message slots take place and also the length of the message slots. The message slot timing and slot length are usually built into the system at the time it is made. As already noted all of the accumulators or counters can be binary counters although it is also contemplated to use variable voltage or capacitor charge devices and other such devices if desired.

The total number of message slots for all airplanes or other equipment may consume several seconds and ordinarily will include several thousand or more individual message slots assigned to individual airplanes. The synchronizing operation for any one airplane will therefore take place within its assigned message slot after the rough initial synchronization is completed and will be repeated each time its assigned slot occurs.

The set in each airplane will transmit a signal at the beginning of each occurrence of its asigned slot. These signals are indicated in FIGS. 2–4 by the symbol $T_0$. The total synchronizing operation for any individual airplane will then take place during its assigned message slot as already noted. Obviously the total number of available message slots and the total time for the entire sequence of message slots to repeat itself can be varied to accommodate any desired number of airplanes or other objects having timing devices, and the duration of each assigned message slot can also be varied. The duration or length of the message slots, however, is a function of system range, and a one millisecond message slot length would provide approximately 40 miles of system range.

The signal transmitted by an airplane at $T_0$ is received at the ground station at a later time $T_1$. This stops the accumulators or counters 28 at all ground stations within range thereof, and at a later time in the same message slot, when the count-down counters 30 reach the same count, return signals are transmitted from the ground stations back to the airplane. These return signals are received by the airplane and the time of receipt thereat is compared with a preselected time in the assigned message slot of the airplane. If the return signals arrive exactly at the preselected time then the airplane's timing device is in synchronism and nothing further needs to be done. If, however, the return signals are not received at the preselected time, the time difference between the time the return signals are received and the preselected time will equal twice the time difference or phase shift between the timing device in the airplane and the timing devices or standards at the ground stations. It will then be necessary to correct the airplane's timing device by shifting its time an amount equal to one-half of this difference. It is usuallly desirable that the preselected time for comparison with the return signals from the ground station be ahead of the end of the assigned message slot of the airplane in order to be able to make the necessary phase correction before the message slot ends. This is done so that there will be no overlapping or interference between equipment assigned to adjacent message slots.

It will also be apparent that if the time standards at all ground stations are synchronized then the return signals from all ground stations within the range of an airplane, regardless of distance, will arrive at the airplane at the same time, preferably the time $T_s$. If the return signals from the several ground stations do not arrive at the airplane at the same time it means that one or more of the ground stations is out of synchronism. This therefore provides a convenient way to check the accuracy of the time standards at the ground stations.

When the return signal from the ground station is received by the airplane several things take place. For one thing, the receiver in the airplane feeds the return signal to a synchronizing pulse detector and shaper 54. If the assigned message slot signal is present from the message slot counter and selector 48, the synchronizing pulse detector and shaper 54 produces an output signal on lead 55 for energizing a ramp generator and voltage clamping device 56. The pulse detector and shaper 54 also feeds the signal on lead 55 to two "and gates" 60 and 70 which are well known electronic devices used for controlling operations in a system by passing output signals under certain predetermined conditions and not under other conditions. "And gates" 60 and 70 are also under control of a gate generator 58 which recognizes specific times related to the synchronizing time by detecting the count contained in the message slot length counter 46. These times are indicated in FIG. 5 by a signal occurring on leads 45 and 47. In a typical case the signal on lead 45 occurred ahead of synchronizing time by 217 microseconds and the signal on lead 47 occurred at synchronizing time.

An early gate signal from the gate generator 58 will occur on lead 59 and be fed to the "and gate" 60 which then passes signals generated by the pulse detector and and shaper 54 within the 217 microsecond period prior to or ahead of the preselected synchronizing time $T_s$. If the synchronizing pulse from the pulse detector and shaper 54 is received by the gate 60 during this period prior to synchronizing time, the gate will produce an output which will be fed to the electronic switch 50 to double the counting rate by feeding the output of precision oscillator 40 to the second stage binary counter in the message slot length counter 46 instead of to the first stage counter. This produces a double counting rate which is employed for the period $\Delta T$, which is the difference in time between the airplane timing device and the ground station timing device as already explained. After the ($\Delta T$) period has elapsed a synchronizing time pulse on lead 47 is fed to the electronic switch 50 to return the counting rate to normal. This pulse is generated in message slot length counter 46 at a count corresponding to the preselected synchronizing time.

A uniformly increasing voltage is generated by the ramp generator 56 upon receipt thereby of the synchronizing time pulse on the lead 47. This voltage increases at a uniform rate until a synchronizing pulse is received from the synchronizing pulse detector and shaper 54 on lead 55 or until the end of the message slot is reached. If a synchronizing signal is received from the ground station during this period it will stop the ramp voltage and start discharging the voltage through the ramp discharge device 62 at twice the rate at which it was generated. The ramp discharge device 62 is also connected to control the electronic switch 50 by stopping the message slot length counter 46 during this discharge time. After the ramp generator voltage has been discharged the ramp discharge device 62 again energizes the electronic switch 50 to restore the message slot length counter to normal counting rate.

If the synchronizing pulses from the ground station are consistently received either early or late during repeated synchronizing operations, this indicates that the frequency of the precision oscillator or timing device 40 needs adjusting. If the synchronizing pulse is received early the "and gate" 60 will produce an output which energizes an events counter 64 or other suitable accumulator means. After the counter 64 has counted or responded to a predetermined number of succeeding early impulses, it will actuate a motor control 66 and a motor 67 which will drive a fine frequency correction device 68 to adjust the frequency of the precision oscillator 40. If the error is consistent in the opposite direction the "and gate" 70 and a different events counter or accumulator 72 will be energized to drive the motor 67 in the opposite direction to adjust the frequency of the oscillator 40.

If, before either of the counters 64 or 72 reaches its predetermined count for making a frequency correction, an error in the opposite direction is experienced the events counter will be reset and will have to begin counting all over again before a frequency correction can be made. Devices for resetting counters or accumulators are well known in the art. The number of consecutive error counts in the same direction that must be experienced before a frequency correction is made is a matter of choice and experience.

The time required for the entire synchronization process to take place is very short and is repeated every few seconds depending on the total number of message slots and their time duration. The process is also completely automatic requiring no effort by the pilot or other personnel.

Synchronism will take place each few seconds during the time that an airplane is within range of a ground station. However, since the type of oscillators being used are extremely accurate it is expected that very little phase or frequency shift will take place and therefore airplanes will be able to travel considerable distances with no ground contact whatsoever and still not have their timing devices drift very far from synchronism.

In the system described above it is only necessary to have count-down counters 30 at the ground stations. However, if the airplanes are also equipped with count-down counters then it becomes possible, and it is contemplated, to have two airplanes synchronized with each other, to have a ground station synchronize to an airplane or to have two ground stations synchronize to each other.

FIG. 5 illustrates one of many possible ways of synchronizing timing devices such as atomic clocks or precision oscillators according to the present invention. It is contemplated, however, that many changes, re-arrangements, reconnections, modifications and variations of the device as shown and described could be made without changing the basic idea. Many of the actual circuits employed for the various blocks shown in FIGS. 1 and 5 are standard well known electronic circuits employing known electronic components and operate in known ways. For example, "and gates" are well known electronic devices for passing impulses under certain conditions and not under others; accumulators such as binary counters, are well known; oscillators, such as crystal oscillators are well known; electronic switches are well known, and receiving means, transmitting means, control circuit means, and frequency varying circuits are also all well known electric and electronic devices and circuits, and in the present device they operate in their usual manner. No claim therefore is made for any one individual circuit or circuit component. It is believed to be novel, however, to combine the above circuits and circuit components in a manner similar to that shown and described herein for the purpose of synchronizing two or more timing devices, taking into account the fact that the devices may be spaced from each other and may also be moving relative to one another.

It is contemplated to employ the present synchronizing means in any structure or system where accurate time is required. Several such structures have already been described or suggested. In addition, it is contemplated to use accurate timing devices in satellites as a means for periodically synchronizing timing devices all around the world. The advantages and reasons for doing this are many and varied. The subject synchronizing means can also be employed on space vehicles where speeds and distances are relatively great to determine positional and other information. In space applications, however, unlike the applications already suggested it will probably be necessary to provide means for taking into account the longer propagation times and the greater speeds involved. Where speeds and distances are relatively small in terms of propagation times as in the case of airplanes and slower moving objects, the device will operate satisfactorily and can be constructed substantially in the manner herein disclosed.

Figure 6:
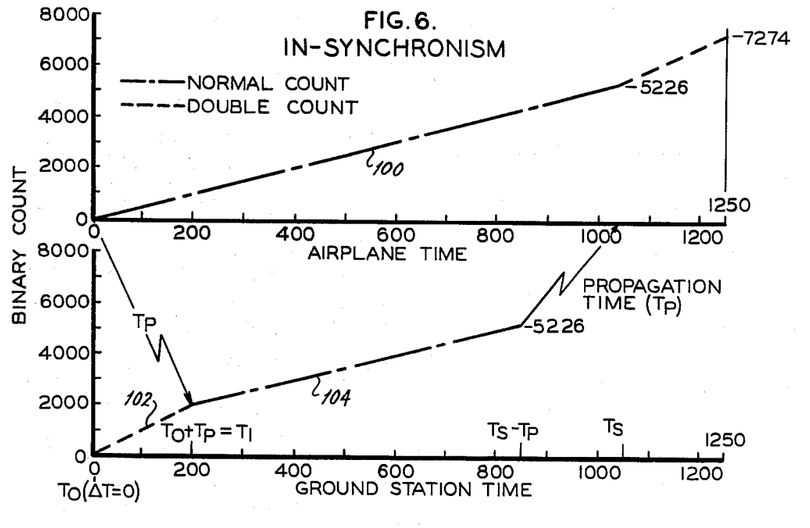
FIG. 6 is a graphical representation similar to FIG. 2 illustrating the operation of a modified form of the subject synchronizing means, the graph illustrates the condition in which two remotely positioned timing devices are synchronized.
Figure 7:
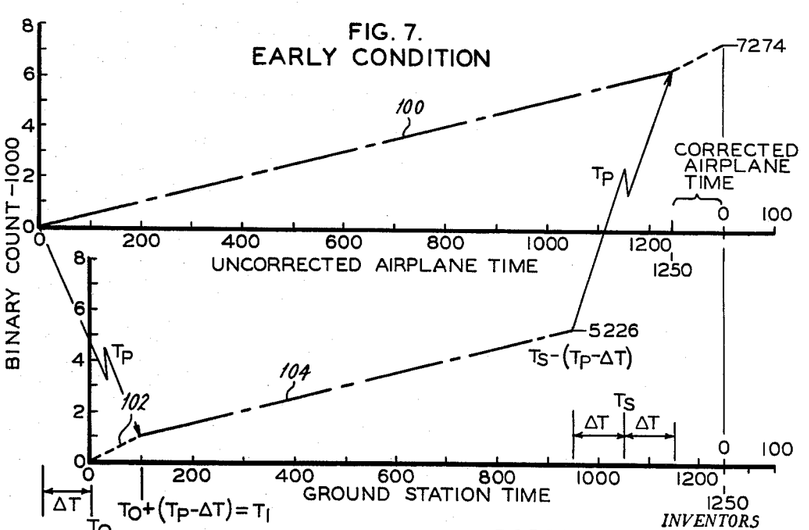
FIG. 7 is a graphical representation similar to FIG. 6 but illustrating the condition where the timing device to be synchronized is ahead of synchronism.
Figure 8:
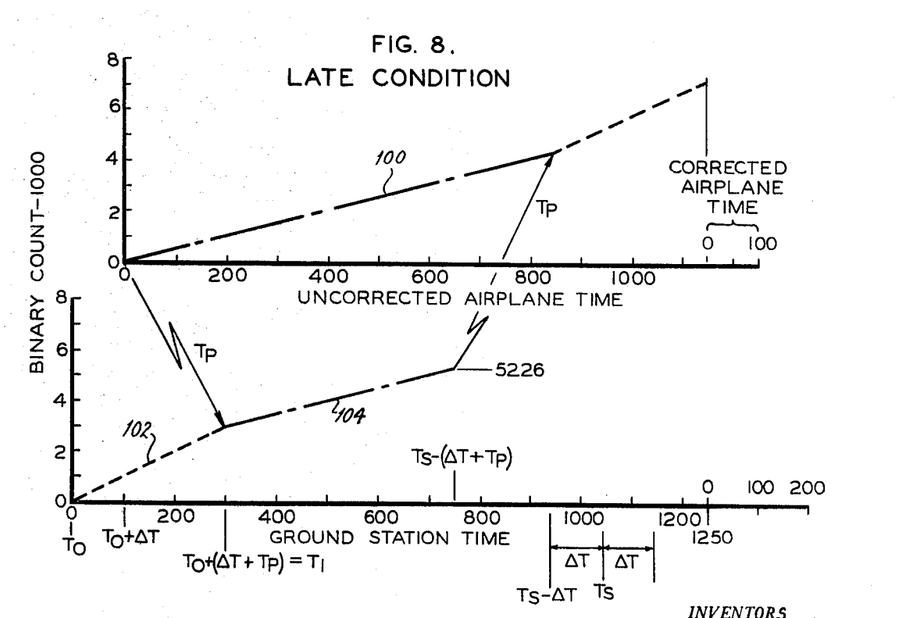
FIG. 8 is another graphical representation similar to FIG. 6 illustrating the condition where the timing device to be synchronized is behind synchronism or is late.

FIGS. 6-8 are graphs somewhat similar and analogous to the graphs shown in FIGS. 2-4 respectively. However, the graphs of FIGS. 6-8 differ from those of FIGS. 2-4 in that they describe the operation of a synchronizing device that employs a unidirectional accumulator or counter instead of requiring count-up and count-down counters.

In the graphs of FIGS. 6-8 the total time period shown represents one airplane message slot. It is to be understood, however, that if the device is to be used in a collision avoidance system that there may be thousands of similar message slots occupying a total time interval of several seconds or more depending upon the number of airplanes or other devices to be accommodated. It is also expected that there may be spaced ground stations to monitor all of the message slots and to provide means to which the airplanes may be synchronized. As in the system already described, the ground stations in the modified construction will transmit signals at the zero or first message slot positions which will enable each airplane within the range thereof to adjust its timing means so that its message slots generally are in accord with the message slots at the ground stations. This occurs shortly after the airborne sets are put into operation and ordinarily is not repeated in the airplane although the ground station will repeatedly send these zero message slot signals.

The synchronization procedure at each airplane thereafter takes place during its assigned message slot as in the earlier described embodiment. Furthermore, as in the earlier embodiment each airplane within range of a ground station will check its synchronism and will correct for errors every few seconds during the time of its assigned message slot.

Figure 9:
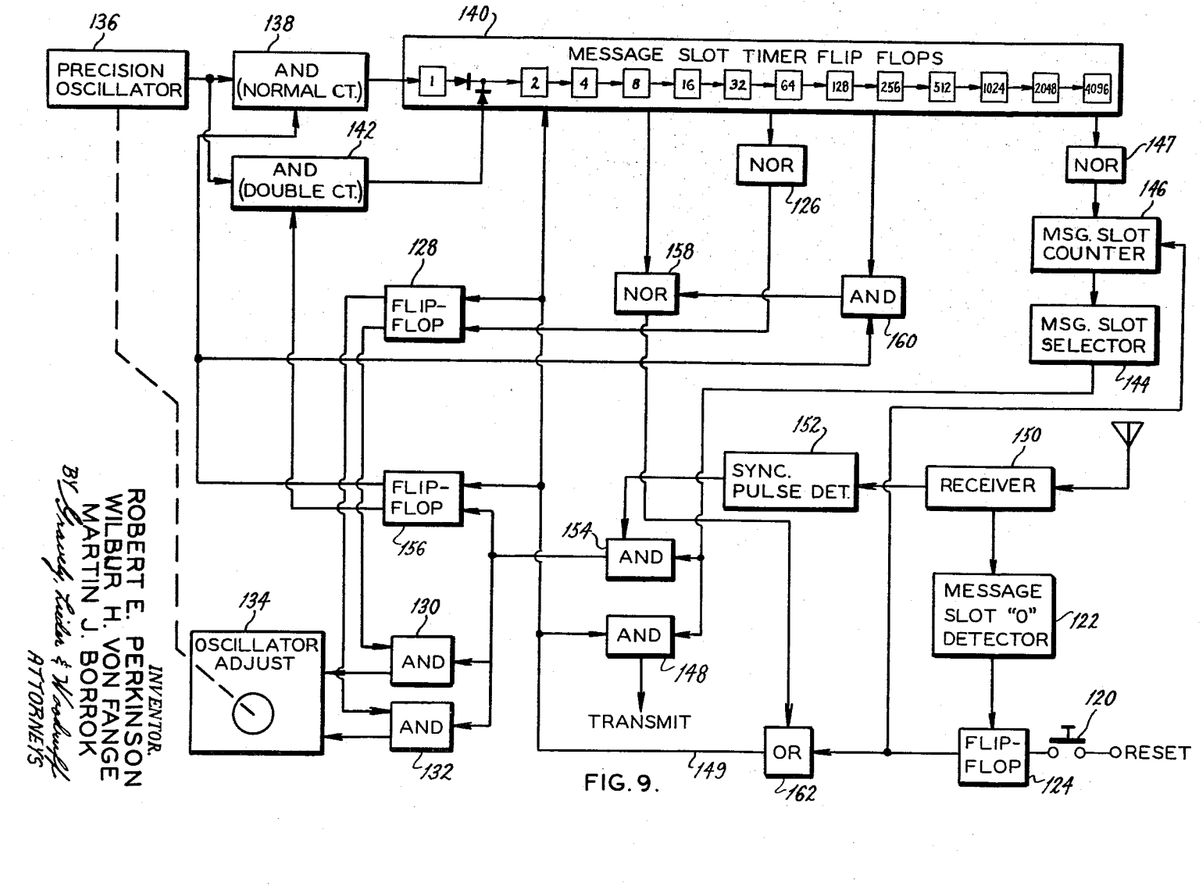
FIG. 9 is a block diagram showing a synchronization device constructed according to a modified form of the present invention.

In the modified embodiment which is shown in the block diagram of FIG. 9 each airplane transmits a signal at the beginning of its assigned message slot. At the same time accumulator or counter means in the airplane commence counting in preselected time increments at their so called normal counting rate, see the line 100 in FIG. 6. The signal thus transmitted by each airplane is received at the ground stations within range thereof at a later time $T_1$ due to the propogation time $T_p$. Each ground station also has accumulator or counter means. However, the counter means at the ground stations count at double the normal counting rate commencing at the beginning of each message slot. This is illustrated in FIGS. 6-8 by the greater initial slope of the ground station counting curve 102. The double counting rate at the ground station continues until the signal is received from the airplane at time $T_1$. At this time, the counting rate at the ground station changes from the double counting rate to a normal counting rate as indicated by line 104, and continues at this rate until a preselected count is reached. In the drawing the preselected count is arbitrarily selected to be a count of 5226. When this preselected count is reached the ground station transmits a return signal to the airplane. In the meantime the airplane counter has been counting at the same normal counting rate from the beginning of its message slot. If the return signal from the ground station arrives at the airplane when the counting means in the airplane is exactly at a count of 5226, the airplane is in synchronism, otherwise not. This condition is illustrated in FIG. 6. If the return signal does not arrive at the airplane when the airplane counter has a count of 5226 a phase correction must be made. In either case when the signal from the ground station is received at the airplane, the counting means at the airplane changes from a normal counting rate to a double counting rate and continues at the double rate until a preselected count is reached and then resets and starts over at the normal rate in the following message slot. In FIG. 6 the end of the message slot is denoted by the preselected count of 7274.

If it should occur that no return signal is received at the airplane then the airplane counter will proceed to count to a fixed count of 6250 and reset to begin counting in the next message slot.

An advantage of the modified embodiment disclosed and illustrated in FIGS. 6-9 is that it allows the use of a unidirectional counter at each ground station instead of a count-up and count-down counter. The modified construction also requires an accurate time standard at each ground station. The modified embodiment also has somewhat simpler controls.

FIG. 7 illustrates the condition in which the airplane timing device is ahead of the ground station timing device by an amount equal to $\Delta T$. In this situation as already noted in connection with FIG. 6 the ground station commences double counting at the beginning of each message slot and is switched to a normal counting rate at a time $T_1$, which is earlier than the corresponding time $T_1$ in FIG. 6 by the amount $\Delta T$. In the case of an early timing device in an airplane the double counting rate at the ground station takes place for a relatively shorter duration than in FIG. 6, and the ground station counter will therefore take longer to reach the predetermined count level of 5226 which is the time it transmits a return signal. This means that the return signal will be received at the airplane at a later time than the uncorrected predetermined synchronizing time in the message slot of the airplane timing device by an amount of time equal to $2\Delta T$. Consequently to correct the phase of the timing device at the airplane, the counter means in the airplane will be switched to its double counting rate later in the message slot by $2\Delta T$ in terms of the airplane time as compared to FIG. 6, and therefore will reach the count of 7274 at $\Delta T$ later than in FIG. 6 before being reset to begin the next message slot. Therefore, by shortening the period of double count at the airplane the message slot length is increased to bring it into synchronism with the ground station.

FIG. 8 illustrates the opposite condition from FIG. 7 wherein the airplane timing device is out of phase by being behind or later than the ground station. In this case the ground station counter will have to double count for a relatively longer period of time at the beginning of its message slot and therefore will reach the 5226 count sooner by $\Delta T$ as compared to the condition shown in FIG. 6. This means that the return signal to the airplane will be transmitted sooner and hence will arrive at the airplane sooner. This also means that the counter in the airplane will commence double counting sooner by $\Delta T$ as compared to the FIG. 6 condition, and its message slot will therefore be shortened by $\Delta T$ to bring it into synchronism.

Many of the circuits and circuit components for the airplane equipment employed in the modified embodiment of FIG. 9 are similar to the circuits and circuit components employed in the circuit illustrated in FIG. 5, and therefore it is not deemed necessary to describe each element and component in detail. Also the more important elements and components are identified in the drawing by suitable legends.

It will be noted however, that the elements 120, 122 and 124 are provided for the initial rough synchronization of the equipment under control of a zero message slot impulse or impulses from the ground stations, and the elements 126, 128, 130, 132 and 134 are provided for correcting frequency errors in the precision oscillator timing device 136. This is done by adjusting a variable capacitor or reactor element in the circuit of the timing device 136.

The element 138 is the normal count control gate and is connected between the precision oscillator 136 and the message slot timer 140. Similarly the element 142 is the double count control gate which doubles the normal counting rate under the conditions described above in connection with FIGS. 6–8.

The element 144 is the message slot selector and is provided to determine when the assigned message slot takes place. This is determined by a comparison between a predetermined count and the count in the message slot counter 146 which counts each message slot as it occurs. A "nor gate" 147 is connected between the timer 140 and the counter 146 and passes a message slot count impulse therethrough each time a predetermined message slot timer count is reached. The counter 146 is reset by the flip flop 124 during the initial rough synchronizing.

Once the assigned message slot is reached the element 144 passes an impulse to "and gate" 148 which energizes means to transmit a signal at time $T_0$ which is indicated by a reset pulse or lead 149.

As soon as a return signal is received from the ground station at receiver 150 as described above, a signal is fed to a sync pulse detector 152 which passes it along to another "and gate" 154. With the set still operating in the assigned message slot as determined by the selector 144, when the return impulse is fed to the "and gate" 154, a signal will be produced to energize a flip-flop circuit 156 which in turn energizes the double count element 142 and deenergizes the normal count element 138.

A "nor gate" 158 is also provided for the purpose of resetting the timer 140 at the predetermined count of 6250 in the event that no return signal is received from the ground station. If a signal is received from the ground station, however, it energizes circuits to change to double count rate, and the same signal also energizes "and gate" 160 to prevent the "nor gate" 158 from functioning until timer 140 reaches the predetermined count of 7274.

When a count of 7274 is reached during a synchronizing operation with the flip flop 156 in its double count condition, the combined logic of the "nor gate" 158 and the "and gate" 160 results in a reset signal on lead 149 being supplied to the message slot timer 140 through "or gate" 162. The "or gate" 162 is also used in the initial rough synchronization operation to reset the timer 140 when the reset switch 120 is closed and the zero message slot signal is received.

There are also other ways and arrangements of counters that could be used to determine transmission and receiving times which will provide information by which it will be possible to synchronize two or more remotely positioned timing devices. All such systems which eliminate from consideration propagation time, by inversely relating a return signal transmission time and some preselected time in the message slot to the time of receipt of a signal and the beginning of the message slot are deemed covered by this invention.

When the subject synchronizing means are employed on airplanes equipped with crystal oscillators or atomic clocks, it will be possible to maintain all of the oscillators or clocks in exact synchronism. With this condition, it then becomes merely a matter of receiving signals from other airplanes in their assigned message slots to determine the distances between airplanes and also the range rate of said other airplanes. It is also contemplated when the system is in operation that each airplane will also transmit information as to its altitude and changes of altitude during its assigned message slot.

It is readily understandable therefore that the present invention is particularly well adapted for use in collision avoidance equipment where it can simultaneously accommodate a great many airplanes. It is not intended however, to limit use or application of the device to a collision avoidance system or even to airplanes, and it is believed many applications for its use will become readily apparent, some of which are suggested in this specification.

Thus it is apparent that there has been shown and described novel means for synchronizing remotely positioned timing devices which fulfills all of the objects and advantages sought therefor. Many changes, modifications, and variations of the subject device however, will become apparent to those skilled in the art after considering this specification and the accompanying drawings. All such changes, modifications, and variations which do not depart from the spirit and scope of the invention are deemed to be covered by the invention which is limited only by the claims which follow.

What is claimed is:

1. Means for synchronizing first and second timing devices comprising first and second timing devices capable of keeping time in preselected increments and groups of increments, means for comparing a preselected group of increments of the first timing device with a preselected group of the second timing device to ascertain if the compared groups take place simultaneously, said comparing means including transmitter and receiver means operatively connected to each of the first and second timing devices, means at one of said timing devices for periodically transmitting signals which are received at the other timing device during the first half of corresponding increment groups, said other timing device including means for transmitting return signals at later times inversely related to a predetermined synchronizing instant of time relative to the relationship between the time of receipt of the signals from the one timing device and the beginning of the same increment groups, and means for shifting the time during which the said increment groups from one of said timing devices takes place in a direction to make later occurrences of the said corresponding groups at the first and second timing devices take place simultaneously.

2. Means for synchronizing a plurality of timing devices capable of keeping time in preselected increments and groups of increments comprising a plurality of remotely positioned timing devices each capable of keeping time in preselected increments and groups of increments, means for assigning a different distinct group of increments to each timing device for synchronizing purposes, means for comparing the time of occurrence of the assigned group of increments of each timing device with the time of occurrence of the same increment group at another timing device to see if the compared groups occur simultaneously, and means for periodically shifting the time of occurrence of one of said compared groups at one of the timing devices relative to the time of occurrence of the same corresponding increment group at the other timing device in a direction to make similar later occurrences of the same corresponding increment groups take place simultaneously at both of the timing devices.

3. Means for comparing the timing of remotely positioned timing devices comprising a first timing device capable of keeping time in preselected time periods, at a preselected rate and in preselected time increments, a second timing device spaced from the first timing device and capable of simultaneously keeping time in the same preselected periods, at a preselected rate, and in preselected increments, means for comparing the time periods of the first timing device with the time periods of the second timing device to determine if they occur simultaneously, said last named means including transmitting means operatively connected to said first timing device for transmitting a signal at a preselected time in its time periods, receiving means operatively connected to the second timing device for receiving said signal, transmitting means at said second timing device, accumulator means at said second timing device for accumulating the time increments from the beginning of its time periods to the end of said periods, said accumulator means including means for identifying the time in the period at which the signal is received from the transmitting means at the first timing device, and means for energizing the transmitting means thereat to transmit a return signal to the first timing device at a time inversely related to the end of the time period but equal in length of time to the length of the time difference between the beginning of its time period and the time at which the signal was received from the first timing device, and means at the first timing device for comparing the time at which the return signal is received with a preselected time in its time period.

4. Means for comparing the timing of remotely positioned timing devices comprising a first timing device capable of keeping time in preselected time periods, at a preselected rate and in preselected time increments, a second timing device spaced from the first timing device and capable of simultaneously keeping time in the same preselected periods, at a preselected rate, and in preselected increments, means for comparing the time periods of the first timing device with the time periods of the second timing device to determine if they occur simultaneously, said last named means including transmitting means operatively connected to the first timing device for transmitting a signal at the beginning of a time period, receiving means operatively connected to the first timing device, transmitting and receiving means operatively connected to the second timing device, counter means at the second timing device for counting time increments during the time periods thereof, said counter means including means for energizing the transmitting means thereat to transmit a return signal to the first timing device at a time later in the same time period than the time of receipt of the signal from the first timing device, said later time being inversely related to a preselected time in the time period thereof relative to the relationship between the time at which the signal was received from the first timing device and the beginning of its time period, and means at said first timing device for comparing the time at which the return signal is received with a preselected time in its time period.

5. The comparing means defined in claim 4 wherein means are provided for shifting the time period of said first timing device so that the return signal during subsequent time periods is received thereat at the said preselected time in its time period.

6. The comparing means defined in claim 5 wherein the preselected time for comparing purposes occurs before the end of the time period so that the time shifting means has time to operate before the time period ends.

7. Means for comparing the timing of remotely positioned timing devices comprising a first timing device capable of keeping time in preselected time periods, at a preselected rate, and in preselected time increments, a second timing device spaced from the first timing device and capable of simultaneously keeping time in the same preselected periods, at the same preselected rate, and in the same preselected time increments, means for comparing the time periods of the first and second timing devices to determine if they occur simultaneously, said last named means including an increment counter operatively connected to the first timing device to count the time increments during each time period thereof, a second counter operatively connected to the second timing device to count the time increments during each time period thereof, means for transmitting an impulse from said first timing device at the beginning of a time period, means at the second timing device for receiving said impulse at a later time in the said period, transmitting means at said second timing device for transmitting a return impulse therefrom at a time inversely related to a preselected instant by the same amount that the impulse was received relative to the beginning of its time period, said return impulse being received by the receiving means at said first timing device, and means for comparing the time at which the said return impulse is received with a preselected instant of time in the time period of said first timing device.

8. The comparing means defined in claim 7 wherein means are provided for shifting the time of occurrence of the time periods of the first timing device so that the return impulses received in subsequent periods will arrive at the first timing device at the preselected instants of time in the said time periods thereof.

9. Means for synchronizing one or more remotely positioned time devices to one or more synchronizing timing devices, all of said devices being capable of keeping time in the same preselected increments and increment periods, said periods having finite beginnings and endings, transmitting, receiving, and time measuring means operatively connected respectively to each of said time devices and synchronizing timing devices, the time measuring means at each of said devices measuring time increments from the beginning to the end of each time period, means for assigning a different time period to each of said time devices for synchronizing purposes, means at each of said time devices for energizing the transmitting means thereat to transmit a signal at a predetermined initiate time relative to the beginning of its assigned time period, said signals from said time devices being received at each of said other time devices and at each of said synchronizing timing devices within the range thereof at later times depending upon the propagation time between the transmitting and receiving devices and the difference in time of occurrence of the time periods at said transmitting and receiving devices, the time measuring means at each synchronizing timing device responding to the time at which the said signals are received and including means for energizing the transmitting means thereat to send return signals at times inversely related to preselected later times by the amount of time difference between the synchronizing devices initiate time and the receipt of the incoming signals, said return signals being received by the respective receiving means at each of the said transmitting time devices at still later times depending on the propagation time, and means at each of the said time devices for comparing the time of receipt of its return signal with the preselected synchronizing time.

10. The synchronizing means defined in claim 9 wherein means are provided at said transmitting time devices to shift the time of the end of its assigned time period by an amount equal to one-half of the time interval between the receipt of its return signal and the preselected synchronizing time, said shift to terminate the time period earlier than otherwise if the return signal is received before said synchronizing time and later if the return signal is received after the said synchronizing time.

11. Means for synchronizing two or more remotely positioned time devices each of which is capable of keeping time in preselected periods, said periods having finite beginnings and endings, transmitting, receiving and counting means operatively connected respectively to each of said time devices, the counting means at each time device counting time in increments from the beginning to the end of each time period, means at one of said time devices for energizing the transmitting means thereat to transmit a signal at a predetermined time relative to the beginning of its time period, said signal being received at the other time devices at a later time by an amount depending upon the distance between the said devices, the counting means at at least one of said receiving time deviecs recording the time at which the said signal is received, and said counting means including means for energizing the transmitting means thereat to send a return signal at a time related inversely to a later preselected time but equal in duration to the relationship between the time at which the signal was received thereat and the beginning of the said time period, said return signal being received by the receiving means at the said one time device, and means at said one time device for comparing the time of receipt of said return signal with a preselected synchronizing time in its time period.

12. The synchronizing means defined in claim 11 wherein means are provided at said one time of occurrence device to shift the time of its time period by an amount equal to one half the time difference between the time at which the return signal is received and the preselected synchronizing time.

13. The synchronizing means defined in claim 11 wherein means are provided at said one time device to adjust the frequency thereof to be the same as the frequency of said one receiving time device.

14. The synchronizing means defined in claim 11 wherein the counting means at both time devices are the same so that each device can be synchronized to the other.

15. Means for synchronizing remotely positioned timing devices comprising a first timing device capable of keeping time in preselected time periods, means associated with the first timing device for transmitting impulses at preselected times in the time periods, a second timing device capable of keeping time in the same preselected time periods as the first timing device, said second timing device having means associated therewith for transmitting impulses and for receiving impulses transmitted by the transmitting means associated with the first timing device, means associated with the receiving means for keeping time during each time period, said time keeping means including accumulator means responsive to the passage of preselected time increments to simultaneously keep time by accumulating time increments commencing at the beginning of each time period and increasing to the end of each period and by also commencing with an initial increment count at the beginning of each period and reducing said initial count with the passage of each increment to arrive at a final lower count at a later predetermined time in the time period, means for stopping the count of the increasing increment accumulator means upon receipt by the receiving means of a signal from the transmitter associated with the first timing device, and means for energizing the transmitting means associated with the second timing device to transmit a return signal when the count of the decreasing increment accumulating means is the same as the count at which the increasing increment accumulator was stopped.

16. The means for synchronizing remotely positioned timing devices defined in claim 15 wherein said first timing device includes receiving means for receiving the return signal transmitted by the transmitting means associated with the second timing device, and means for comparing the time at which the return signal is received with a preselected time in the time period.

17. The means for synchronizing remotely positioned timing devices defined in claim 15 wherein means are provided in operative association with the first timing device for shifting the time of occurrence of its time periods so that the return signals received from the transmitting means of the second timing device during subsequent time periods will arrive exactly at said preselected instants of time in said subsequent periods.

18. The means for synchronizing remotely positioned timing devices defined in claim 17 wherein said means for shifting the time occurrences of the time periods include means for doubling the time keeping rate of said accumulator means for a time interval equal to the time duration between the receipt of the return signals and the corresponding preselected instants of time.

19. The means for synchronizing remotely positioned timing devices defined in claim 17 wherein said means for shifting the time of occurrence of the time periods include means for decreasing to one-half the time keeping rate of said accumulating means for a time interval equal to twice the time difference between the occurrences of corresponding time intervals of the first and second timing devices.

20. The means for synchronizing remotely positioned timing devices defined in claim 17 wherein said means for shifting the time of occurrences of the time periods of the first timing device relative to the second timing device shifts the time of occurrence by an amount of equal to one-half of the time difference between the time of receipt of the return signal and the preselected time.

21. Means for synchronizing a timing device with a remotely positioned time standard, said device and said standard both being capable of keeping time in predetermined time increments and increment periods, the invention comprising a timing device capable of keeping time in preselected increments and increment periods, means associated with said device for transmitting signals near the beginning of preselected increment periods of said device, receiver means associated with said device, and means for counting the time increments from the beginning of each increment period to the end, a time standard capable of keeping time in preselected time increments and equal duration increment periods, means associated with the standard for transmitting signals and for receiving signals transmitted by the transmitting means associated with the timing device, and counter means associated with said standard including means for simultaneously counting increments by adding time increments during each increment period and other counting means starting with an initial increment count at the beginning of each time period and counting by subtracting time increments during said period, said adding and subtracting counting means covering a common range of increment counts during each increment period, means for stopping the adding increment counter means in response to receipt by the receiving means at the time standard of a signal from the transmitting means at the timing device, means for comparing said stopped count in the adding increment counting means with the count in the subtracting increment counting means, said comparing means including means for energizing the transmitter means at the time standard to transmit a return signal when the two compared counts are equal, said return signal being received by the receiving means associated with the timing device, and means associated with the timing device for comparing the time at which the said return signal is received with a preselected time in the increment period thereof.

22. The synchronizing means defined in claim 21 wherein there are a plurality of spaced timing devices and a plurality of spaced time standards, each of said timing devices being assigned a different time period in which to transmit a signal for synchronizing purposes, and each of said time standard being capable of operating in all of the said time periods.

23. Means for synchronizing a plurality of remotely positioned timing devices comprising a plurality of remotely positioned timing devices capable of keeping time in equal duration succeeding time periods, transmitting, receiving and counting means capable of counting at a preselected rate operatively connected respectively to each of said timing devices, means for making each of said timing devices effective in a different preselected one of said time periods, a plurality of remotely positioned time standards capable of keeping time in the same time periods, transmitting, receiving and counting means operatively connected respectively to each of said time standards, said counting means at the standards counting at a preselected rate commencing at the beginning of each time period, means associated with each timing device for transmitting a signal at the beginning of its assigned time period, said signals being received at time standards within the range thereof at later times depending on the propagation distances therebetween, means at the receiving time standards for changing the counting rate thereat by a factor of 2 to 1, means associated with said time standards for transmitting a return signal to the respective time devices when the counting means thereat reaches a predetermined count, said return signals being received simultaneously at the respective time device at later times in the assigned time periods depending upon the propagation distances thereto, and means at the timing devices for comparing the time of receipt of the return signals with the time in the time period when the counting means thereat should have a preselected count.

24. The synchronizing means defined in claim 23 wherein each of said timing devices is provided with means to shift the time of occurrence of its time periods so that they occur simultaneously with the corresponding time periods at the time standards, said shifting means shifting the time of occurrence of the time periods of the associated time devices by an amount equal to one-half of the difference in time between the time of receipt of the return signal and the time in its assigned time period when its counting means thereat should have the said preselected count.

References Cited by the Examiner
UNITED STATES PATENTS

| | | | |
|---|---|---|---|
| 3,045,234 | 7/1962 | Sandretto | 343—112 X |
| 3,068,473 | 12/1962 | Muth | 343—102 X |
| 3,183,504 | 5/1965 | Graham | 343—7.5 |

MALCOLM A. MORRISON, *Primary Examiner.*

C. L. WHITHAM, *Examiner.*

K. W. DOBYNS, *Assistant Examiner.*